(12) United States Patent
Kang et al.

(10) Patent No.: US 8,248,217 B2
(45) Date of Patent: Aug. 21, 2012

(54) TACTILE DISPLAY APPARATUS AND METHOD THEREOF

(75) Inventors: Sung Chul Kang, Seoul (KR); Dongseok Ryu, Seoul (KR); YongKwun Lee, Gyeongsangnam-do (KR); Dong-Soo Kwon, Daejeon (KR); Seung-Chan Kim, Gyeonggi-do (KR); Tae-Heon Yang, Chungcheongnam-do (KR); Chong Hui Kim, Daejeon (KR); Gi-Hun Yang, Chungcheongnam-do (KR)

(73) Assignee: Korea Institute of Science and Technology, Seoul (KR)

( * ) Notice: Subject to any disclaimer, the term of this patent is extended or adjusted under 35 U.S.C. 154(b) by 500 days.

(21) Appl. No.: 12/509,174

(22) Filed: Jul. 24, 2009

(65) Prior Publication Data

US 2010/0073151 A1 Mar. 25, 2010

(30) Foreign Application Priority Data

Sep. 24, 2008 (KR) ........................ 10-2008-0093758

(51) Int. Cl.
*H04B 3/36* (2006.01)

(52) U.S. Cl. ............. 340/407.1; 345/8; 345/9; 434/113; 2/160; 2/163

(58) Field of Classification Search ............... 340/407.1; 345/8, 9; 434/113; 2/160, 161.6, 163
See application file for complete search history.

(56) References Cited

U.S. PATENT DOCUMENTS

| | | | | |
|---|---|---|---|---|
| 4,723,324 A | * | 2/1988 | Lassiter | 2/160 |
| 6,862,006 B2 | * | 3/2005 | Sato et al. | 345/8 |
| 2003/0234823 A1 | * | 12/2003 | Sato et al. | 345/848 |
| 2005/0158695 A1 | * | 7/2005 | Takahashi | 434/113 |
| 2009/0130639 A1 | * | 5/2009 | Skinner | 434/114 |

FOREIGN PATENT DOCUMENTS

| | | |
|---|---|---|
| JP | 06-018341 | 1/1994 |
| KR | 10-0626683 B1 | 9/2006 |

* cited by examiner

*Primary Examiner* — Daryl Pope

(74) *Attorney, Agent, or Firm* — Fenwick & West LLP

(57) ABSTRACT

A tactile display apparatus includes a plurality of stimulation pins in contact with a skin; an operating unit for vertically moving the stimulation pins; and a housing accommodating the stimulation pins and the operating unit, the housing having an opening in one surface thereof such that the stimulation pins protrude outward. Here, the plurality of stimulation pins are arranged such that a contact area occupied by front ends of the stimulation pins is smaller than an area occupied by rear ends of the stimulation pins.

7 Claims, 3 Drawing Sheets

TACTILE DISPLAY APPARATUS AND METHOD THEREOF

CROSS-REFERENCE TO RELATED APPLICATION

This application claims priority to Republic of Korea Patent Application No. 10-2008-93758, filed on Sep. 24, 2008, and all the benefits accruing therefrom under 35 U.S.C. §119(a), the contents of which in its entirety are herein incorporated by reference.

BACKGROUND

1. Field

This disclosure relates to a tactile display apparatus, and more particularly to a tactile display apparatus for providing tactile sensation by operating stimulating pins contacting the skin and a tactile display method using the same.

2. Description of the Related Art

Generally, a haptic device is used for giving kinesthetic feedback or tactile feedback to a user. The sense of touch may be greatly classified into kinesthetic feedback and tactile feedback, in which the kinesthetic feedback gives shape or hardness data of a substance and the tactile feedback gives data about surface roughness and feeling of material of a substance.

In the early stage of development, haptic devices realizing kinesthetic feedback were mainly developed, but, recently, devices giving tactile feedback are actively developed.

The transfer of tactile information has a significant meaning as a new information transfer method, nonexistent in the past, and interaction between a person and a computer, and it may be utilized as an important interface means in human-computer interaction (HCI) or human-robot interaction (HRI).

A haptic device realizing kinesthetic feedback provides kinesthesia mainly for remote control of a robot or work in virtual reality. A representative haptic device (PHANToM—Sensible Co.) realizing kinesthetic feedback was developed for interacting with Virtual Reality Environment, and this device can provide 3 Degree of Freedom force feedback to the user's hand to feel outer shape of the virtual object or stiffness of the object. However, this haptic device is not suitable for realizing surface tactile information of virtual reality or a remote substance.

Accordingly, many studies have been made to overcome the limits of existing tactile feedback transfer devices and to realize the sense of touch on the skin of a human. Skin stimulating methods used for realizing the sense of touch on the skin are greatly classified into a mechanically stimulating method and an electrically stimulating method.

First, the electrically stimulating method is advantageous with respect to low energy consumption, rapid response, small volume, continuous contact with the skin, and relatively less malfunction caused by fewer motions. However, the electrically stimulating method may not easily realize a precise sense of touch on the skin only using electrical stimulations, and it may cause an unpleasant feeling or local pains to users.

The mechanically stimulating method is used to stimulate the skin by operating pins with a linear actuator. However, the existing mechanically stimulating method should use as many pins as possible for precise sense of touch, which increases volume and is thus not helpful for decreasing a size. Also, the existing mechanically stimulating method uses a linear actuator, so it is difficult to minimize gaps among pins, which has a limit in exhibiting more precise sense of touch.

SUMMARY

To solve the above problems, there is provided a tactile display apparatus capable of allowing easy contact to human skin, minimizing a volume and maximizing the degree of precision of the sense of touch without causing an unpleasant feeling to a user, and a tactile display method using the same.

In one aspect, there is provided a tactile display apparatus, which includes a plurality of stimulation pins in contact with a skin; an operating unit for moving the stimulation pins up and down; and a housing accommodating the stimulation pins and the operating unit, the housing having an opening in one surface thereof such that the stimulation pins protrude outward. Here, the plurality of stimulation pins are arranged such that a contact area occupied by front ends of the stimulation pins is smaller than an area occupied by rear ends of the stimulation pins.

Further, the plurality of stimulation pins may be arranged to be concentrated toward a single point or segment of a line.

In addition, each of the stimulation pins may include a pin portion connected to the operating unit; and a plurality of contactors diverging from an end of the pin portion.

Further, the contactors may be perpendicularly bent from the pin portion.

In addition, the operating unit may include a piezoelectric element making a bending motion by an electric signal; a stator attached to one surface of the piezoelectric element; and a mover mounted at an upper portion of the stator to move according to the bending motion of the piezoelectric element by an inertial force, thereby operating the stimulation pin.

Further, the surface of the housing through which the stimulation pins protrude may be configured with a curved surface, and the stimulation pins may be arranged toward a center of curvature of the curved surface.

In addition, a gap between the adjacent stimulation pins may be about 2 mm.

In another aspect, there is also provided a tactile display method for realizing the sense of touch by operating a plurality of stimulation pins contacting a skin, the tactile display method including: determining a height or force at each stimulation point by the stimulation pins depending on a material to be realized; generating an electric signal corresponding to the height or force of the stimulation point; and moving the plurality of stimulation pins toward one point according to the electric signal to keep the height or force at the stimulation point.

In still another aspect, there is also provided a tactile display system using the above tactile display apparatus. The tactile display system includes a display for displaying a screen; a tool unit provided with a point contacting the display to indicate a location on the screen, the tool unit allowing a human body to be partially inserted therein; and a tactile display apparatus for displaying the sense of touch of the screen at a location contacted by the pointer.

This tactile display apparatus has decreased volume since the arrangement of stimulation pins is optimized, and it may provide more accurate sense of touch since the stimulation pins may be densely arranged with smaller gaps.

BRIEF DESCRIPTION OF THE DRAWINGS

The above and other aspects, features and advantages of the disclosed exemplary embodiments will be more apparent

DETAILED DESCRIPTION

Exemplary embodiments of a tactile display apparatus will be described more fully hereinafter with reference to the accompanying drawings.

Figure 1:
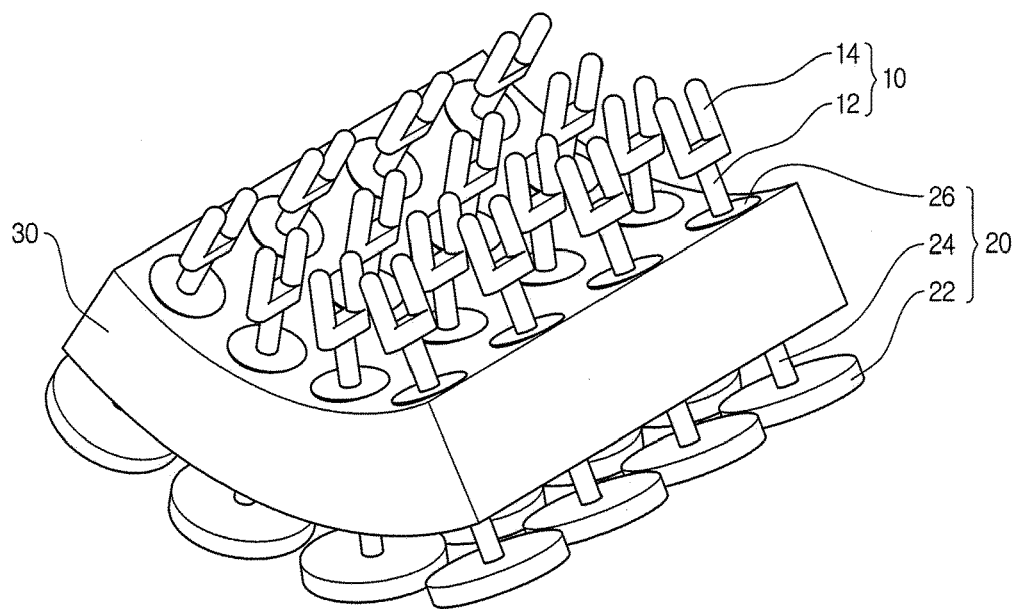
FIG. 1 is a perspective view showing one embodiment of a tactile display apparatus.
Figure 2:
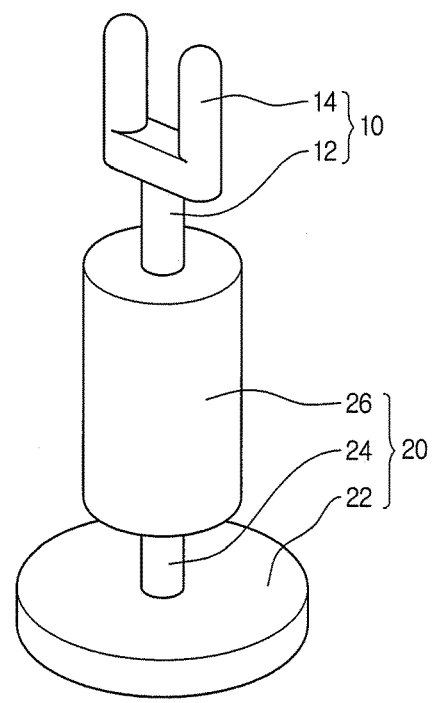
FIG. 2 is a perspective view showing stimulation pins and an operating unit of the tactile display apparatus of FIG. 1.
Figure 3:
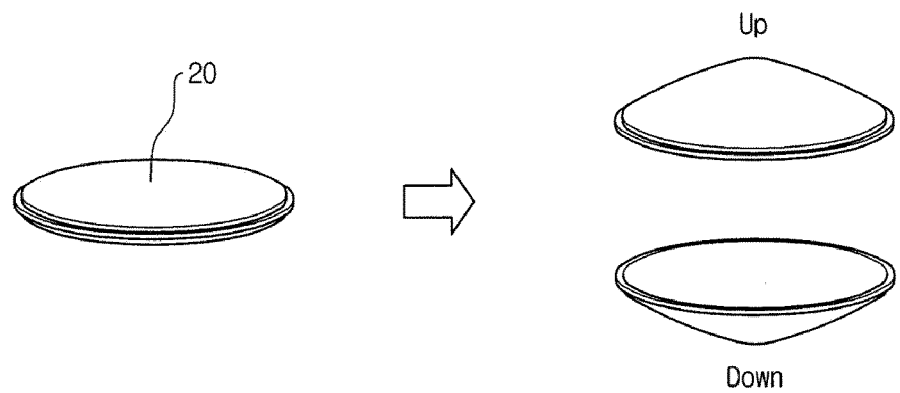
FIG. 3 shows bending motion of a piezoelectric element.

FIG. 1 is a perspective view showing one embodiment of a tactile display apparatus, FIG. 2 is a perspective view showing stimulation pins and an operating unit of the tactile display apparatus of FIG. 1, and FIG. 3 shows bending motion of a piezoelectric element.

Referring to FIGS. 1 and 2, a tactile display apparatus 100 of this embodiment includes a plurality of stimulation pins 10 to be contacted with a skin, an operating unit 20 for moving the stimulation pins 10, and a frame 30 to support the stimulation pins 10 and the operating unit 20.

The stimulation pins 10 are arranged in horizontal and vertical directions of the frame 30 at regular intervals, and the stimulation pins 10 are concentrated toward one point. Here, the expression "the stimulation pins are concentrated toward one point" includes not only the case that extension lines of the stimulation pins pass through one point but also the case that extension lines pass near one point. For example, the stimulation pins 10 may be arranged in a radial shape.

The stimulation pins 10 are arranged such that a contact area occupied by front ends of the stimulation pins 10 is smaller than an area occupied by rear ends of the stimulation pins 10.

Further, each of the stimulation pins 10 has a pin portion 12 and a plurality of contactors 14 diverging from the pin portion 12. The plurality of contactors 14 diverging from the pin portion 12 allow the realization of more precise sense of touch since a plurality of contact points may be formed by operating one stimulation pin 10. In this embodiment, two contactors 14 perpendicularly diverge from the pin portion 12, but the number and arrangement of contactors may be changed variously.

The operating unit moves the stimulation pins 10 in a vertical direction to cause linear motion of about 2 to about 5 mm. The operating unit may use a rotary actuator or a linear actuator. The rotary actuator needs a separate mechanism such as screws and nuts to convert rotation into linear motion, but the linear actuator does not need such separate mechanism for conversion into a linear motion. The linear actuator may be a voice coil motor, a piezoelectric element, and so on.

The operating unit 20 of this embodiment uses a piezoelectric element. In more detail, the operating unit 20 includes a disk-type piezoelectric element 22 making a bending motion by an electric signal, a stator 24 attached to an upper portion of the piezoelectric element 22, and a mover 26 slidably mounted at the stator 24.

The piezoelectric element 22 makes a rapid bending motion to be convex upward or downward in response to an electric signal, as shown in FIG. 3. For example, if the piezoelectric element 22 is convex downward, the stator 24 attached to the piezoelectric element 22 is moved downward together. At this time, the mover 26 is moved upward due to an inertial force generated by the downward motion of the stator 24. As the mover 26 moves upward, the stimulation pin 10 fixed to the mover 26 is moved upward together, and, thereby, stimulates the skin. On the contrary, if the piezoelectric element 22 is convex upward, the stimulation pin 10 is moved downward according to the same principle.

Based on this principle, the piezoelectric element 22 may control vertical motion of the stimulation pin 10 by suitably adjusting an electric signal such that the time during which vibration occurs to be convex upward and the time during which vibration occurs to be convex downward are controlled. For example, in case voltages of +5 V and −5 V are periodically applied to the piezoelectric element, the vertical motion of the stimulation pin 10 may be controlled by adjusting the time during which +5 V is applied and the time during which −5 V is applied.

Figure 4:
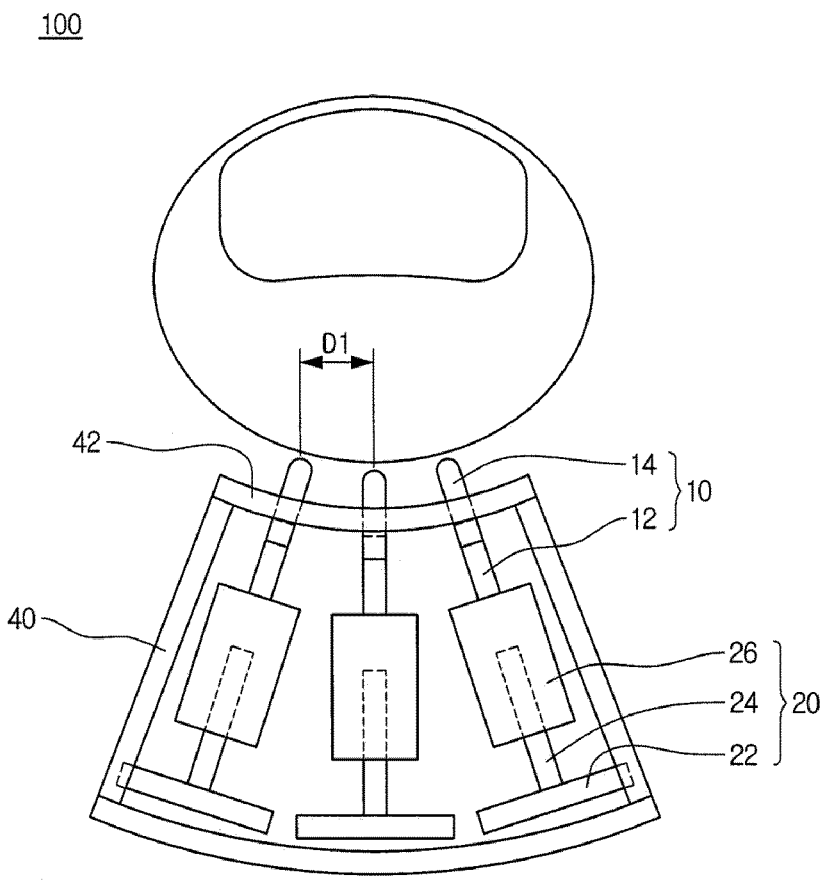
FIG. 4 is a schematic side view showing one embodiment of a tactile display apparatus.

The above tactile display apparatus 100 is entirely accommodated in a housing 40 (see FIG. 4). The housing 40 has an opening on one surface thereof such that the contactor 14 of the stimulation pin 10 may protrude out therethrough.

Figure 5:
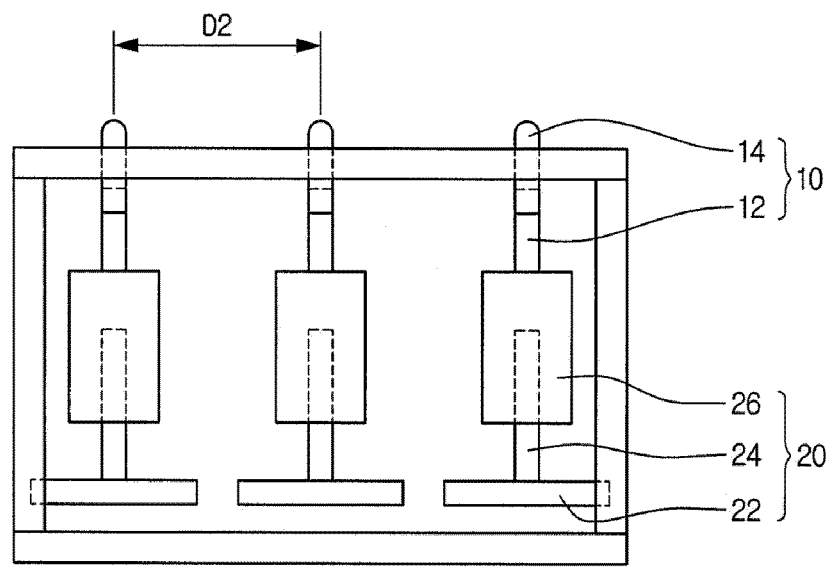
FIG. 5 is a schematic side view showing the tactile display apparatus having stimulation pins arranged in parallel.

FIG. 4 is a schematic side view showing one embodiment of a tactile display apparatus, FIG. 5 is a schematic side view showing the tactile display apparatus having stimulation pins arranged in parallel.

Referring to FIG. 4, the tactile display apparatus 100 of this embodiment is configured such that the stimulation pins 10 are concentrated toward one point, so that gaps D1 among the stimulation pins 10 may be decreased. Compared with gaps D2 of stimulation pins 10 arranged in parallel as shown in FIG. 5, it would be found that the gap D1 of the stimulation pins 10 of this embodiment is smaller than the gap D2 of the comparative example. Accordingly, the stimulation pins 10 of the tactile display apparatus 100 of this embodiment may be densely arranged to realize precise sense of touch.

The gap D1 of the stimulation pins 10 may be set to about 2 mm. If the gap is less than about 2 mm, the corresponding stimulation may not be easily distinguished. Thus, about 2 mm is an optical gap size.

Further, one surface 42 of the housing 40 through which the stimulation pins 10 protrude outward is configured with a curved surface. At this time, the stimulation pins 10 may be arranged toward a center of curvature of the surface 42 of the housing. Accordingly, the stimulation pins 10 may be arranged perpendicularly to the surface of a human finger when stimulating the skin.

Figure 6:
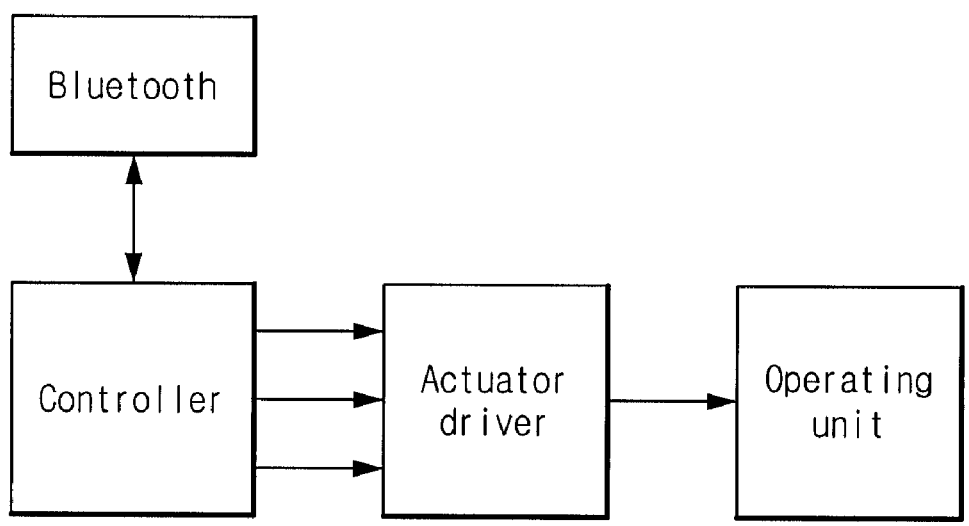
FIG. 6 is a block diagram showing one embodiment of the tactile display apparatus.

FIG. 6 is a block diagram showing one embodiment of the tactile display apparatus.

Referring to FIG. 6, a controller generates a data bus, an address bus and a control signal and transmits them to an actuator driver to control the actuator driver. The actuator driver receives the data bus, the address bus and the control signal from the controller and generates a control signal to control the operating unit 20, thereby operating the piezoelectric element 22. The controller transmits and receives data through a PC or Bluetooth in a wireless manner.

In addition, height or force of the stimulation pins 10 are determined depending on material to be realized, and such data are input to the controller. If the material to be realized is input to the controller, the controller generates a signal corresponding to the height or force and transmits the signal to the actuator driver. The actuator driver receives the signal from the controller and then moves the stimulation pins 10 toward one point to keep the height or force at the stimulation point when realizing the sense of touch.

The above disclosure illustrates the preferred embodiment of the present invention, but the present invention is not limited thereto and many changes or modification can be made within the scope of the appended claims, the detailed description and the drawings. These changes or modifications should be apparently included in the scope of the present invention.

What is claimed is:

1. A tactile display apparatus, comprising:
   a plurality of stimulation pins for contact with a skin;
   an operating unit for moving the stimulation pins up and down; and
   a housing accommodating the stimulation pins and the operating unit, the housing having an opening in one surface thereof such that the stimulation pins protrude outward,
   wherein the plurality of stimulation pins are arranged such that a contact area occupied by front ends of the stimulation pins is smaller than an area occupied by rear ends of the stimulation pins, and
   wherein the operating unit comprises:
      a piezoelectric element making a bending motion by an electric signal;
      a stator attached to one surface of the piezoelectric element; and
      a mover mounted at an upper portion of the stator to move according to the bending motion of the piezoelectric element by an inertial force, thereby operating the stimulation pin.

2. The tactile display apparatus according to claim 1, wherein the plurality of stimulation pins are arranged to be concentrated toward a single point or segment of a line.

3. The tactile display apparatus according to claim 1, wherein each of the stimulation pins comprises:
   a pin portion connected to the operating unit; and
   a plurality of contactors diverging from an end of the pin portion.

4. The tactile display apparatus according to claim 3, wherein the contactors are perpendicularly bent from the pin portion.

5. The tactile display apparatus according to claim 1, wherein the surface of the housing through which the stimulation pins protrude is configured with a curved surface, and the stimulation pins are arranged toward a center of curvature of the curved surface.

6. The tactile display apparatus according to claim 1, wherein a gap between the adjacent stimulation pins is about 2 mm.

7. A tactile display method for realizing the sense of touch by operating a plurality of stimulation pins for contacting a skin, the tactile display method comprising:
   determining a height or force at each stimulation point by the stimulation pins depending on a material to be realized;
   generating an electric signal corresponding to the height or force of the stimulation point; and
   moving the plurality of stimulation pins toward one point according to the electric signal to keep the height or force at the stimulation point, wherein the stimulation pins are operated by a piezoelectric element that makes a bending motion by an electric signal.

* * * * *